United States Patent

Edge et al.

[11] 3,884,665
[45] May 20, 1975

[54] FLAT GLASS MANUFACTURING APPARATUS AND METHOD

[75] Inventors: Charles K. Edge, Sarver; Gerald E. Kunkle, New Kensington, both of Pa.

[73] Assignee: PPG Industries, Inc., Pittsburgh, Pa.

[22] Filed: Mar. 27, 1974

[21] Appl. No.: 455,463

Related U.S. Application Data

[63] Continuation-in-part of Ser. No. 338,497, March 6, 1973, Pat. No. 3,843,346.

[52] U.S. Cl.................................. 65/99 A; 65/182 R
[51] Int. Cl.............................................. C03b 18/02
[58] Field of Search................ 65/65 A, 99 A, 182 R

[56] References Cited
UNITED STATES PATENTS

| | | | |
|---|---|---|---|
| 710,357 | 9/1902 | Heal | 65/182 R X |
| 789,911 | 5/1905 | Hitchcock | 65/182 R |
| 3,233,995 | 2/1966 | Javaux | 65/99 A |
| 3,485,614 | 12/1969 | Long | 65/99 A |
| 3,508,902 | 4/1970 | Cusick | 65/182 R |

*Primary Examiner*—Robert L. Lindsay, Jr.
*Attorney, Agent, or Firm*—E. Kears Pollock

[57] ABSTRACT

A flat glass manufacturing apparatus is disclosed which comprises a glass melter and molten glass conditioner connected to a forming chamber which contains molten metal on which a continuous sheet of flat glass may be formed. The molten glass conditioner is connected to the forming chamber by a molten glass delivery means which includes a convex threshold over which the molten glass flows onto the molten metal. Molten glass contact with the threshold member is minimized in that most of the glass entering the forming chamber has not contacted the threshold member and that which has moves relatively slowly in comparison to the general flow of molten glass over the threshold member.

16 Claims, 3 Drawing Figures

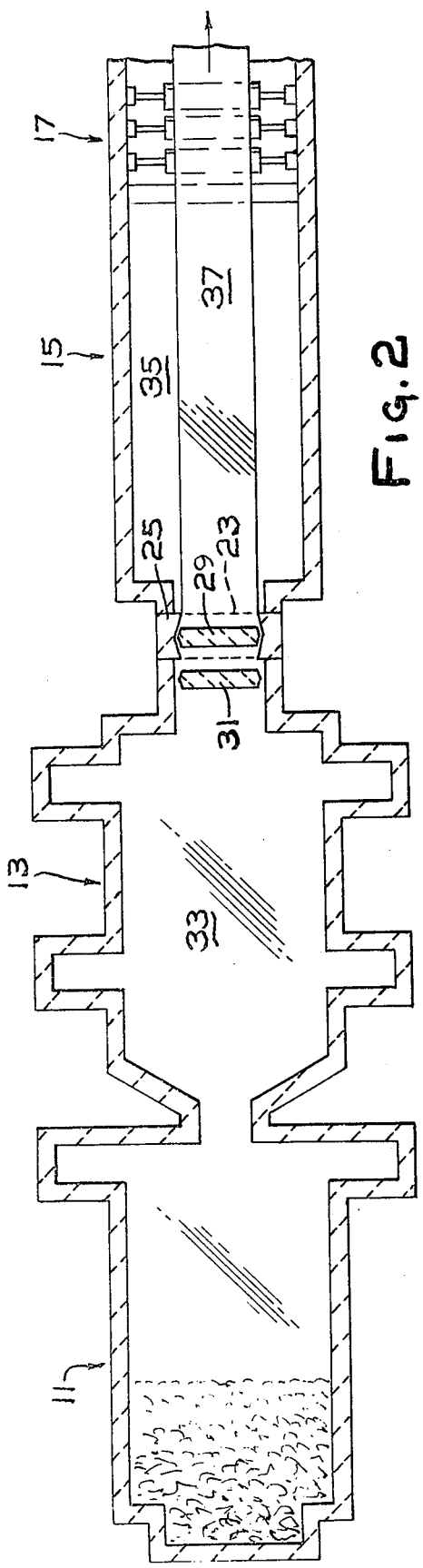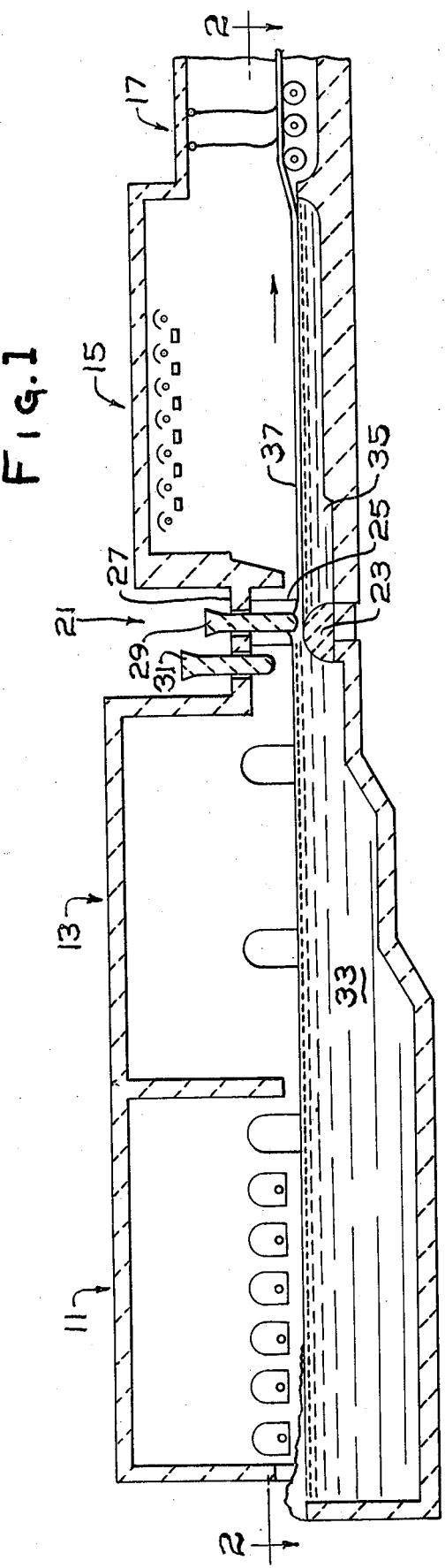

FLAT GLASS MANUFACTURING APPARATUS AND METHOD

CROSS-REFERENCE TO RELATED APPLICATIONS

This application is related to Application Ser. No. 338,497, filed Mar. 6, 1973, entitled "Manufacture of Glass by Contiguous Float Process," filed in the names of Charles K. Edge and Gerald E. Kunkle. This application is a continuation-in-part of that application; priority is claimed from the date of that application for this application as to commonly disclosed subject matter, and the disclosure contained in that application is specifically incorporated by reference herein. Application Ser. No. 338,497 matured into U.S. Pat. No. 3,843,346 issuing Oct. 22, 1974.

BACKGROUND OF THE INVENTION

Field of the Invention: This invention relates to apparatus for the manufacture of a continuous sheet of flat glass by supporting molten glass on a pool of molten metal while forming and cooling the glass. More particularly, this invention relates to an apparatus and method for delivering molten glass onto a pool of molten metal for forming.

Description of the Prior Art: Molten glass may be delivered onto molten metal and formed into a continuous sheet or ribbon of glass according to the teachings of Heal, U.S. Pat. No. 710,357 and of Hitchcock, U.S. Pat. No. 789,911, and according to the patents of Pilkington, U.S. Pat. No. 3,083,551 and U.S. Pat. No. 3,220,816. In all of the prior art, molten glass is delivered over some rigid element, usually a refractory member, onto molten glass. In the practice disclosed by Pilkington, the molten glass is delivered through a long, narrow canal and over a lip from which the molten glass falls onto the molten metal and spreads outwardly on the molten metal. In the methods of Heal and Hitchcock, the molten glass is delivered over a refractory bridge or wall onto molten metal contained adjacent to such a refractory wall downstream of the furnace in which the molten glass is prepared.

According to the disclosures of both Heal and Hitchcock, molten glass flows from a pool of molten glass over a generally flat surface and then onto molten metal in a forming chamber. Molten glass flowing over a flat surface like the surfaces disclosed in Heal and Hitchcock imposes a significant drag upon the surface over which it flows. This causes substantial erosion of the underlying surface and generally causes the bottom surface of the glass ribbon produced from such a stream of glass to be characterized by linear defects associated with this drag. These defects extend along the direction of draw and appear as regions of optical distortion when visually observed. These lines become more pronounced in appearance when the bottom surface of the glass is either silvered or etched.

Recognizing the problem of bottom surface damage experienced from practicing the methods of Heal or Hitchcock and using the apparatus disclosed therein, Pilkington discloses a method whereby molten glass after flowing over a flat delivery surface is caused to fall and flow rearwardly and outwardly from the location where molten glass falls onto the pool of molten metal. In this way, the glass which has been flowing in contact with the flat delivery surface is caused to spread outwardly such that it becomes concentrated in the outwardly disposed marginal portions of a continuous ribbon or sheet of flat glass formed on the molten metal. There the glass which had been in contact with the flat refractory surface may be severed from the remainder of the glass sheet and discarded. The present invention provides means for overcoming the problems associated with the practices of Heal or Hitchcock and without introducing additional problems which occur when practicing the method disclosed by Pilkington.

SUMMARY OF THE INVENTION

Glassmaking materials are melted in a glass melter. From this melter molten glass flows into a glass refiner or conditioner connected to the glass melter. In the conditioner, the molten glass is gradually cooled to a suitable temperature for forming and the molten glass is then delivered from the conditioner onto a pool of molten metal in a glass forming chamber. In the glass forming chamber, the molten glass which has been delivered onto the surface of the molten metal in the form of a wide, relatively shallow stream is cooled to form a continuous, dimensionally stable sheet of glass. It may be stretched or attenuated by the application of longitudinal forces, lateral forces or both to form a sheet of desired thickness. This continuous sheet of glass is then withdrawn from the forming chamber for further processing.

The molten glass is delivered from the conditioner to the glass forming chamber through a delivery means, generally comprising an enclosed channel. The molten glass is withdrawn from the refiner and caused to flow along a substantially horizontal path through an opening defined by a bottom or threshold member, side members and a top member. At least one of these opening defining members is movable so that the size of the opening may be varied. Preferably, the top member is movable and is characterized as a metering member. The molten glass is delivered onto the molten metal (preferably tin) in the forming chamber while maintaining the bottom surface of the glass at about the same elevation as the top surface of the threshold member. The glass flow is maintained substantially undisturbed in this manner.

The threshold member extends across the path of glass flow in the bottom of the delivery means. The upwardly facing surface of this threshold member over which the molten glass flows is convex.

The channel through which the molten glass flows onto the molten metal also includes side members or jambs which extend upwardly from the ends of the threshold member. The marginal edges of the stream of molten glass flowing over the threshold member engage the side members. Joining the side members and extending over the threshold is a roof. In general, the metering member or tweel extends downwardly from the roof over the threshold member so as to engage the upper surface of the molten glass flowing over the threshold member. The tweel is used to control the size of the opening through which molten glass flows. In general, the metering member is aligned with the threshold member with its lowermost portion substantially in line with the highest portion of the upwardly facing convex upper surface of the threshold. In some instances, it may be desirable to locate the metering member slightly downstream of the uppermost portion of the threshold member. The directions "upstream" and "downstream" are defined by the direction of glass flow through the process; that is, glass flows from an upstream portion of the glassmaking apparatus toward a downstream portion of the glassmaking apparatus.

The threshold member preferably comprises a refractory such as fused silica or fused cast alumina. However, the threshold may be constructed of a material such as an inert metal, particularly platinum, which does not react with the glass. The preferred materials for the threshold and other delivery members are substantially pure (greater than 90 percent by weight) alumina or silica. Such materials fused in the substantial absence of other materials that could form undesired eutectic phases provide glass contact surfaces that do not cause glass marking like that caused by conventional refractories. Fused silica is particularly preferred because of its dimensional stability over a wide temperature range.

Preferably, the downstream portion of the upper convex surface of the threshold is partially submerged in the pool of molten metal in the forming chamber. The upper convex surface of the threshold may be shaped as a continuous curve as would be generated by rotating a straight line about one or more axes. For example, the convex surface may be a section of a cylinder or may be parabolic or hyperbolic in shape. It has been found, however, convenient both for construction and operation to provide a threshold member having an upper surface comprising a plurality of substantially flat or planar surfaces with their regions of intersections slightly rounded to blend the relatively flat surfaces into a continuous convex surface. A particularly useful threshold shape is one having a substantially horizontal portion at its highest region. A particularly useful threshold shape is one having three substantially planar portions comprising its upper surface: one, horizontal, as an uppermost portion; a second, about 15° to 35° from the horizontal, as an upstream portion; and a third, 5° to 20° from the horizontal, as a downstream portion. Such a threshold, when used in combination with a metering member or tweel, substantially aligned with the intersection between the middle horizontal portion and the downstream portion, has yielded particularly beneficial results.

The threshold member may be provided with means for heating or cooling the threshold as described in the parent of this application, which is incorporated by reference. For example, cooling pipes may extend through the threshold member, or resistance heating elements may extend through it.

One of the advantages of using a threshold having a convex upwardly facing shape in the making of flat glass is that the flowing molten glass, as it engages the upstream portion of the convex threshold, has its velocity diminished because of the converging cross section available for glass flow. While the glass closest the threshold flows slowly, the glass farther from the threshold continues to flow at a relatively greater velocity. Thus, glass which has not been in contact with or proximate to the threshold in the main part of the flowing molten glass proceeds over the threshold in a much greater amount than that glass which is and has been flowing close to the threshold. The applicants have found that the rate of damage to a refractory element in contact with the flowing glass is greatly influenced by the rate at which the glass flows adjacent the material, and have discovered that by employing a convex threshold the rate of erosion and dissolution of refractory threshold is dramatically diminished. They have also found that the bottom surface of a ribbon of glass produced from molten glass that has flowed over such a threshold is of excellent quality.

The upstream sloped face of a threshold having a multifaced, upper surface preferably extends along a slope sufficient to place the intersection of the upstream sloped face and the upstream vertical face of the threshold at an elevation above the bottom of the conditioner so that when flows are established in a pool of molten glass in the conditioner the neutral flow plane will be at about the same elevation as this intersection. Such a flow may be established by appropriate thermal control in the conditioner according to the teachings of the parent copending application of this application which is incorporated by reference herein. Such a threshold is subject to less wear than a threshold having this intersection at a higher elevation. This is because the glass flow adjacent the upstream sloped face is virtually zero in this arrangement. Meanwhile, upward flow adjacent the upstream vertical face of the threshold is avoided by so locating the threshold with respect to the neutral flow plane. This avoids the danger of glass flow adjacent the threshold bringing subsurface glass from near the bottom of the conditioner into the stream of molten glass being delivered for forming. Since such subsurface glass is often the source of stones, devitrified glass and other defect-causing impurities, this preferred embodiment of the invention provides a means for insuring the production of glass free from the defects caused by such impurities.

In a preferred embodiment, the continuous sheet of glass being drawn is drawn at a rate such that its width is substantially equal to the spacing between the side members of the delivery means. In this way, the process is much more stable than that taught by Pilkington, particularly when the glass being produced has a thickness less than that attained at equilibrium with the molten metal forming bath. This is attributed to the fact that the ribbon or body of glass is anchored along a line rather than only at a point during attenuation.

This invention will be further understood with reference to the drawings accompanying this application.

BRIEF DESCRIPTION OF THE DRAWINGS

FIG. 1 is a longitudinal sectional view of a delivery section connecting a glass conditioner to a glass forming chamber showing the convex threshold of the applicants.

FIG. 2 is a horizontal sectional view taken along sectional line 2—2 of FIG. 1.

DESCRIPTION OF THE PREFERRED EMBODIMENTS

Figure 3:
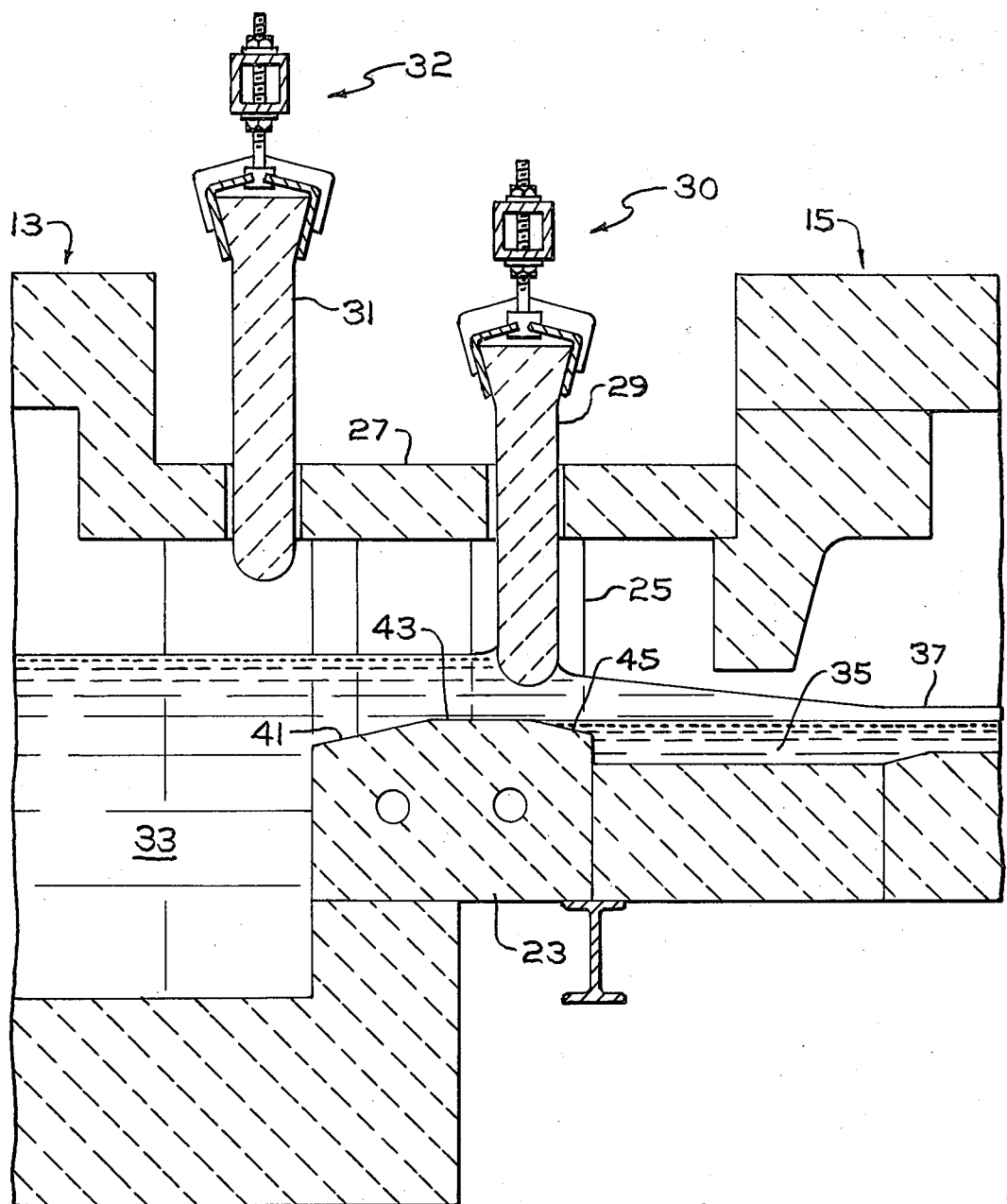
FIG. 3 is an enlarged longitudinal sectional view of a preferred embodiment of the present invention.

Referring now to FIGS. 1 and 2, there is shown a glassmaking facility including a glassmaking furnace and a glass forming chamber. A glass melter 11, such as a conventional regenerative gas- or oil-fired furnace, is provided for melting raw materials to form molten glass.

Connected to the melter 11 is a refiner or glass conditioner 13. Molten glass is refined in the refiner or conditioner 13 in preparation for forming and is contained therein prior to delivery to a forming chamber.

Connected to the refiner 13 is a forming chamber 15. Connected to the forming chamber 15 is a glass take-out apparatus 17.

The refiner 13 and forming chamber 15 are connected through a glass delivery means 21.

The glass delivery means 21 comprises a bottom threshold member 23, side members 25, a roof 27, a metering member 29 and a shut-off member 31. The metering member 29 is movable so that the opening defined by it, along with the side members or jambs 25 and the threshold 23, may be varied. Thus, the rate of glass flow through the opening can be controlled.

Molten glass 33 in the refiner 13 is cooled to a temperature such that its viscosity is within the range of from about $10^3$ to about $10^4$ poises. This molten glass is then withdrawn from the refiner and caused to flow through the opening defined by the threshold, the side members and the metering member onto a pool of molten metal 35 in the forming chamber 15. The body of glass formed on the surface of the pool of molten metal 35 is cooled and attenuated to form a dimensionally stable, continuous sheet or ribbon 37 of flat glass which is removed from the pool of molten metal and the forming chamber by the take-out apparatus 17 generally comprising supporting and conveying rolls.

The present apparatus and method are useful in making flat glass of any composition, such as, for example, soda-lime-silica glasses, alumino-silica glasses, borosilicate glasses and the like. In the making of soda-lime-silica glasses, it has been found particularly beneficial to employ a threshold, side members and a metering member comprising fused cast silica. Fused silica is prepared in a manner similar to that described in U.S. Pat. No. 3,151,964 to North, and is crushed and ground to form fused silica powder. The ground fused silica powder is screened and classified. A casting slip is prepared from the fused silica powder fines, and this slip is cast into suitably shaped plaster molds to make a threshold member, side members and a metering member. The resulting green members are slowly dried and then fired in a kiln to produce a threshold, side members and a metering member, each having extremely smooth surfaces for glass contact.

The physical characteristics of this preferred fused cast silica threshold may be appreciated from a microscopic examination of slivers cut from a threshold or other fused cast silica members, each extending inwardly from its glass contact surface. A distinguishable skin or surface layer is observed. It is about 50 microns thick and comprises fine (10 microns diameter) grains of silica bonded together. Beneath the skin is a distinguishable, dense layer about 5 to 10 millimeters thick comprising large (100 to 350 microns diameter) grains bonded by a matrix of very fine (5 microns and smaller diameter) grains. The interior of the fused cast silica body comprises a porous matrix of coarser (5 to 20 microns diameter) grains surrounding large (100 to 350 microns diameter) grains. Voids having diameters up to one millimeter are found in the porous matrix.

During the production of soda-lime-silica glass, molten glass is delivered over such a fused cast silica threshold at viscosities within the range of from $10^3$ to $10^4$ poises. After months of operation, the threshold shows little sign of wear, and glass produced during the period of operation is free of observable surface marking.

The metering member is a slab shape having a longitudinal cross section, substantially as shown in FIG. 3. This member is similar in shape to a conventional tweel as used in prior processes wherein glass flows over a lip and down onto casting rolls or onto a molten metal forming bath. The metering member preferably has a tapered top portion to secure it in a supporting structure that may be raised and lowered to control the position of the metering member with respect to the threshold.

The side members or jambs are preferably shaped to partially rest on the threshold and partially rest outside the ends of the threshold so that they may be mechanically urged downwardly and inwardly against the threshold. As shown in FIG. 2, the side members are preferably concave-shaped in plan cross section in order to receive the metering member and prevent it from moving downstream due to the hydrostatic and flow forces of molten glass against it.

The threshold is an elongated block shape with its long dimension being that lying transverse to the flow of molten glass. Its width and depth (or height) are preferably as small as possible consistent with providing a threshold of sufficient mechanical strength to permit handling and installation. The threshold is preferably provided with access holes extending through it along its transverse length. These holes are for receiving heaters or coolers to control the threshold temperature during use.

The threshold has a convex upwardly facing top surface. As shown in FIG. 3, the top of the preferred threshold is defined by an upstream face 41, a top, horizontal face 43 and a downstream face 45. The metering member preferably extends downwardly toward the threshold in the vicinity of the top face-downstream face intersection.

In a preferred embodiment, the top face is about horizontal and the upstream and downstream faces are angled downward therefrom. The upstream face is angled from the horizontal about 20°, and the downstream face is angled from the horizontal about 10°. The downstream face extends a sufficient distance so that molten metal of the pool of molten metal in the forming chamber extends over a portion of the downstream face. As molten glass is delivered over the threshold and onto the molten metal, glass flowing adjacent the metering member or the threshold flows sufficiently slowly that erosion of these members is minimal.

Although this invention has been described with reference to particularly preferred embodiments, those skilled in the art of glass-making will recognize that variations may be made in the practice of this invention without departing from the concepts disclosed here. Accordingly, this disclosure is intended to be illustrative rather than limiting, and the applicants have defined their invention in the claims accompanying this disclosure.

We claim:

1. An apparatus for the manufacture of flat glass comprising:
    a. a glass melter;
    b. a glass conditioner connected to said glass melter;
    c. means for forming a continuous, dimensionally stable sheet of glass including a pool of molten metal upon which glass floats during forming said pool of molten metal having an upper surface; and d. means connected to said glass conditioner and to said forming means for delivering molten glass from said glass conditioner onto said pool of molten metal of said forming means; wherein said delivery means is an enclosed channel comprising:
  1. a threshold member over which molten glass may flow extending transversely across the bottom of said channel and having an upwardly-facing, convex upper surface having a highest portion located at least at the elevation of the upper surface of said pool of molten metal, said threshold member being located for separating said pool of molten metal from molten glass in said glass conditioner;
  2. side members extending upwardly from both ends of said transversely extending threshold member; and
  3. a roof member extending between said side members and extending transversely across the top of said channel.

2. The apparatus according to claim 1 wherein said delivery means further comprises a metering member extending transversely across said channel and extending downwardly from said roof member such that its bottom surface is disposed substantially in alignment with the transverse dimension of said threshold member substantially along its highest portion.

3. The apparatus according to claim 2 wherein said upwardly facing, convex upper surface of said threshold member is partially immersed in said pool of molten metal.

4. The apparatus according to claim 1 wherein said upwardly facing, convex upper surface of said threshold member is a curved surface of generation of a line.

5. The apparatus according to claim 4 wherein said upwardly facing, convex upper surface of said threshold member is substantially a section of a cylinder having its axis parallel to the transverse dimension of said threshold member.

6. The apparatus according to claim 1 wherein said upwardly facing, convex upper surface of said threshold member is substantially a series of planar surfaces having rounded regions of intersection.

7. The apparatus according to claim 6 wherein one of said series of planar surfaces is substantially horizontal.

8. The apparatus according to claim 6 wherein the surface of said upwardly facing surface closest said conditioner intersects a substantially vertical upstream face of said threshold at an elevation for establishing a neutral flow plane within a pool of molten glass contained in said conditioner.

9. The apparatus according to claim 6 wherein said delivery means further comprises a metering member extending transversely across said channel and extending downwardly from said roof member and having its bottom, glass engaging surface, substantially in alignment with the transverse dimension of said threshold member.

10. The apparatus according to claim 1 wherein said threshold comprises a substantially pure alumina or silica.

11. The apparatus according to claim 10 wherein said threshold comprises fused cast silica.

12. A method for making flat glass comprising a melting glass;
  a. melting glass;
  b. conditioning molten glass to prepare it for forming;
  c. delivering molten glass over a threshold member having an upwardly facing, convex upper surface onto a pool of molten metal having an upper surface maintained at an elevation substantially at or below a highest portion of the upwardly facing, convex surface of the threshold member;
  d. cooling the delivered molten glass on the pool of molten metal to form a continuous, dimensionally stable sheet of glass; and
  e. withdrawing the continuous sheet of glass from the pool of molten metal.

13. A method of making flat glass comprising the steps of:
  a. establishing a pool of molten glass in a container;
  b. withdrawing a stream of molten glass from the pool of molten glass along a substantially horizontal path, the stream of glass having greater width than depth, by flowing molten glass through an opening in a wall of the container, the opening being defined by a threshold having an upwwardly facing, convex upper surface, side members and a top member, at least one member being movable for varying the size of the opening;
  c. delivering the stream of molten glass onto a pool of molten metal while maintaining its bottom surface elevation substantially at the elevation of the bottom of the opening to form a body of glass on the pool of molten metal;
  d. conveying the body of glass along the surface of the pool of molten metal;
  e. cooling the body of glass from its molten state to form a continuous, dimensionally stable sheet of glass; and
  f. withdrawing the continuous sheet of glass from the pool of molten metal.

14. The method according to claim 13 wherein the width of the body of glass on the pool of molten metal is maintained substantially the same as the width of the stream of molten glass withdrawn from the pool of molten glass.

15. The method according to claim 13 wherein the glass is a soda-lime-silica glass, the threshold is fused cast silica, and the viscosity of the glass in the stream of molten glass is from about $10^3$ to about $10^4$ poises.

16. The method according to claim 13 wherein the pool of molten glass is cooled to establish a flow toward the threshold in an upper portion of the pool and a flow away from the threshold in a lower portion of the pool and wherein the cooling is controlled to establish a boundary between the flows at an elevation substantially at the elevation of an intersection of the upwardly facing surface of the threshold and a substantially vertical face of the wall through which the glass flows by way of the opening defined by the threshold, the side members and the top member.

* * * * *